United States Patent
Baek et al.

(10) Patent No.: US 10,768,467 B2
(45) Date of Patent: Sep. 8, 2020

(54) DISPLAY DEVICE

(71) Applicant: LG ELECTRONICS INC., Seoul (KR)

(72) Inventors: Sangmin Baek, Seoul (KR); Deokwon Lee, Seoul (KR); Juyoung Joung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/405,666

(22) Filed: May 7, 2019

(65) Prior Publication Data

US 2019/0377221 A1    Dec. 12, 2019

(30) Foreign Application Priority Data

Jun. 7, 2018  (KR) .......................... 10-2018-0065554

(51) Int. Cl.
| | | |
|---|---|---|
| *G02F 1/1333* | (2006.01) | |
| *G02F 1/1335* | (2006.01) | |
| *F21V 8/00* | (2006.01) | |

(52) U.S. Cl.
CPC ..... *G02F 1/133512* (2013.01); *G02B 6/0051* (2013.01); *G02B 6/0055* (2013.01); *G02F 1/133308* (2013.01); *G02F 1/133528* (2013.01); *G02F 2001/133317* (2013.01); *G02F 2001/133531* (2013.01); *G02F 2201/08* (2013.01); *G02F 2202/28* (2013.01)

(58) Field of Classification Search
None
See application file for complete search history.

(56) References Cited

U.S. PATENT DOCUMENTS

2019/0235289 A1*  8/2019  Asatani ................ G02B 6/0083

FOREIGN PATENT DOCUMENTS

| JP | 2014-119693 A | 6/2014 |
|---|---|---|
| KR | 10-2013-0136769 A | 12/2013 |
| KR | 10-2014-0061061 A | 5/2014 |
| KR | 10-2017-0050720 A | 5/2017 |
| KR | 10-1744688 B1 | 6/2017 |

* cited by examiner

*Primary Examiner* — Richard H Kim
(74) *Attorney, Agent, or Firm* — Birch, Stewart, Kolasch & Birch, LLP

(57) ABSTRACT

Disclosed is a cinema-type display device employing a typical liquid crystal panel, rather than a cinema-dedicated liquid crystal panel. The display device includes a liquid crystal panel including an active area where an image is output and a bezel area positioned around the active area, a backlight unit for emitting light to a rear surface of the liquid crystal panel, a panel guide including a seating portion where an edge of the rear surface of the liquid crystal panel is seated, and a sidewall portion for covering a side surface of the liquid crystal panel, a bonding member provided in the bezel area to bond the edge of the rear surface of the liquid crystal panel to the seating portion, and a lower polarizing member constituting the rear surface of the liquid crystal panel and having an edge overlapping a part of a front surface of the bonding member.

11 Claims, 17 Drawing Sheets

FIG. 4
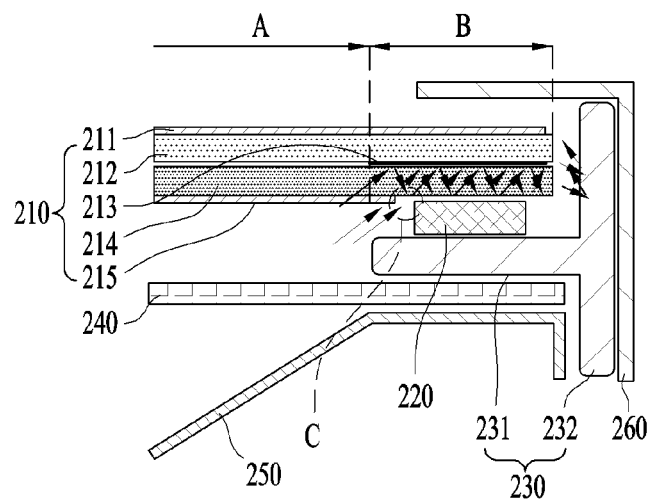
(a)
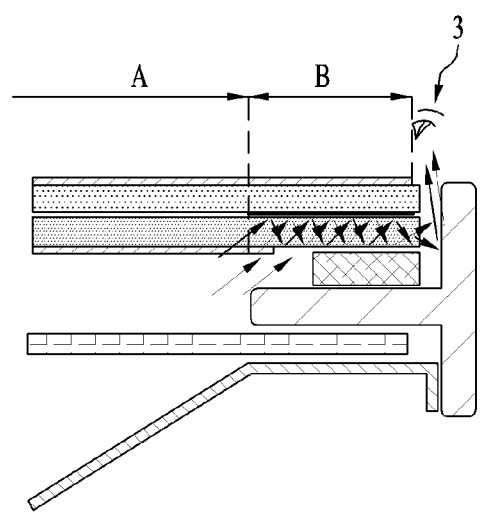
(b)

FIG. 5
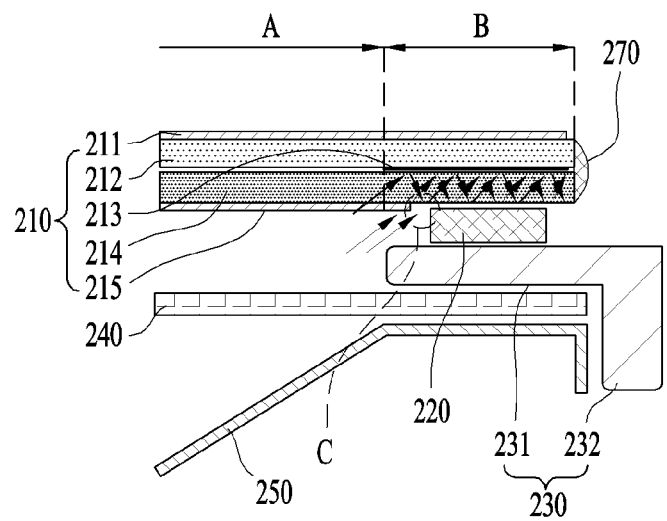
(a)
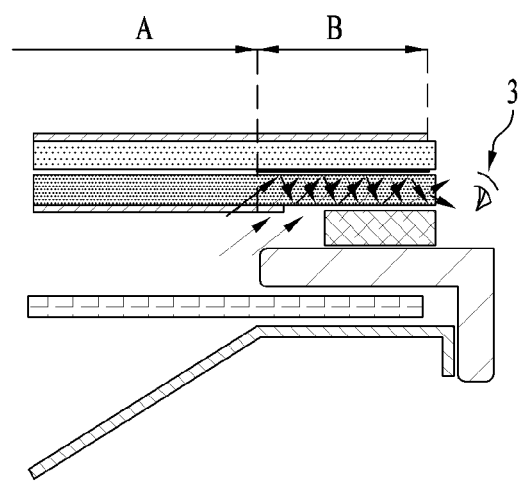
(b)

FIG. 8
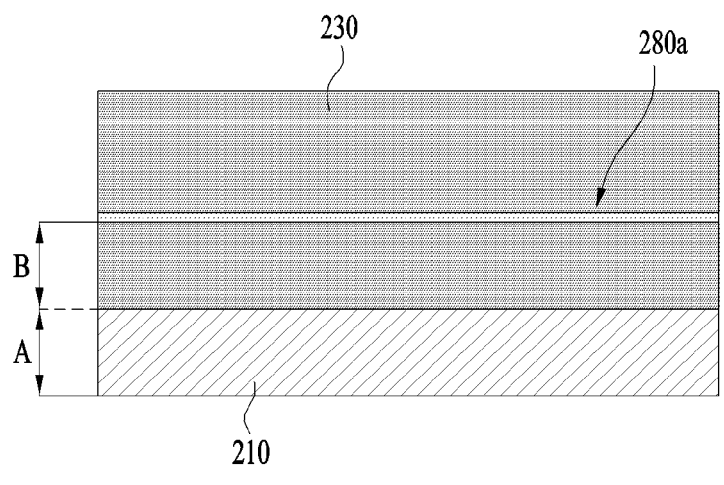
(a)
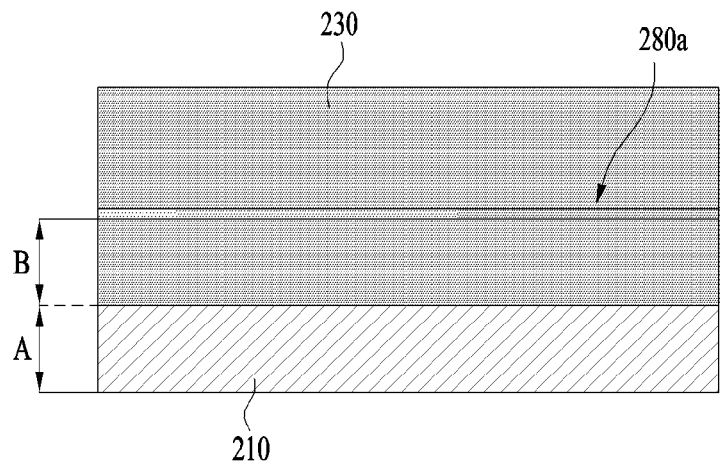
(b)

FIG. 14
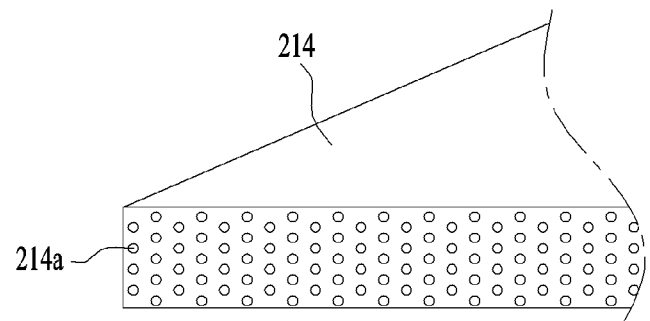
(a)
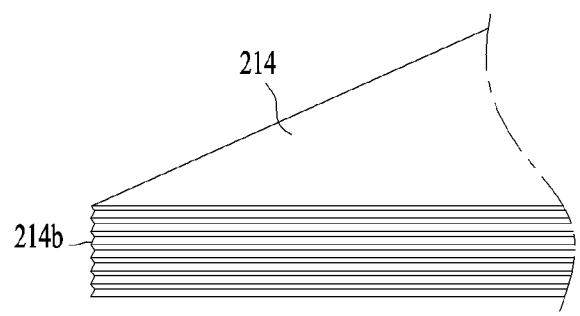
(b)
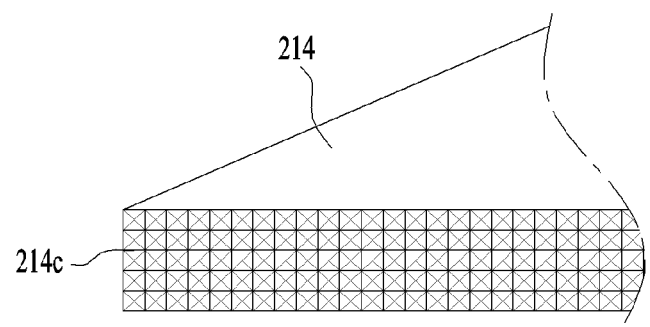
(c)

DISPLAY DEVICE

This application claims the benefit of the Korean Patent Application No. 10-2018-0065554, filed on Jun. 7, 2018, which is hereby incorporated by reference as if fully set forth herein.

BACKGROUND OF THE INVENTION

Field of the Invention

The present invention relates to a display device, and more particularly, to a display device that employs a typical liquid crystal panel rather than a cinema-dedicated liquid crystal panel (a liquid crystal panel with a sealed edge) in a cinema-type liquid crystal module (LCM) and prevents light from leaking through the side surface of the liquid crystal panel.

Discussion of the Related Art

Display devices, which are devices configured to visually display data, include a liquid crystal display, an electrophoretic display, an organic light emitting display, an inorganic Electro Luminescent (EL) display, a field emission display, a surface-conduction electron-emitter display, a plasma display, and a cathode ray display.

Among such displays, the liquid crystal display (LCD) has recently come under the spotlight as they have advantages in terms of mass production, ease of driving means, screen of a high image quality, and implementation of a large-area screen.

The LCD is an electronic device that converts various kinds of electrical information generated by various devices into visual information to be transmitted, using a change in transmittance of liquid crystals according to an applied voltage. The LCD is widely used as an alternative means to overcome the disadvantages of the Cathode Ray Tube (CRT), which has been conventionally used, because the LCD can realize low power driving, a thin structure, and an excellent image quality.

The LCD may include a liquid crystal panel and a backlight unit. The liquid crystal panel functions to adjust the amount of transmitted light to display an image, and the backlight unit is used as an illumination device that uniformly emits light to the entire liquid crystal panel.

The liquid crystal panel and the backlight unit may implement a liquid crystal module (LCM) by being connected with case members for fixing the liquid crystal panel and the backlight unit. The case members may include a guide panel, a cover bottom, and a case top.

In recent years, a cinema-type LCM in which the guide panel defines an outer appearance is preferred to implement lightweight and thin design of the LCD. The cinema-type LCM employs a liquid crystal panel dedicated to cinemas (a liquid crystal panel with a sealed edge) to prevent light from leaking through the side surface of the liquid crystal panel.

However, when a typical liquid crystal panel is used in place of the cinema-dedicated liquid crystal panel in the cinema-type liquid crystal module (LCM), the time required for the production process may be shortened and an economic gain may be expected.

SUMMARY OF THE INVENTION

Accordingly, the present invention is directed to a display device that substantially obviates one or more problems due to limitations and disadvantages of the related art.

An object of the present invention is to provide a display device having a cinema-type liquid crystal module (LCM) for lightweight and thin design.

Another object of the present invention is to provide a display device having a typical liquid crystal panel rather than a cinema-dedicated liquid crystal panel (a liquid crystal panel having a sealed edge) in a cinema-type LCM.

Another object of the present invention is to provide a display device that prevents leakage of light through a side surface of a liquid crystal panel in a cinema-type LCM having a typical liquid crystal panel.

Another object of the present invention is to provide a display device that prevents a liquid crystal panel from being damaged by electrostatic discharge (ESD) in a cinema-type LCM having a typical liquid crystal panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a liquid crystal panel including an active area in which an image is output and a bezel area positioned around the active area, a backlight unit configured to emit light to a rear surface of the liquid crystal panel, a panel guide including a seating portion allowing an edge of the rear surface of the liquid crystal panel to be seated thereon, and a sidewall portion configured to cover a side surface of the liquid crystal panel, a bonding member provided in the bezel area and configured to bond the edge of the rear surface of the liquid crystal panel to the seating portion, and a lower polarizing member constituting the rear surface of the liquid crystal panel and having an edge overlapping a part of a front surface of the bonding member.

According to another embodiment of the present invention, the liquid crystal panel may include an area colored in black to block incident light from backlight unit and absorb light emitted through the side surface along the liquid crystal panel, the area being provided at the edge of the rear surface of the liquid crystal panel corresponding to the bezel area.

According to another embodiment of the present invention, the panel guide may include a groove provided in a surface of the sidewall portion facing the side surface of the liquid crystal panel, and a matt tape provided in the groove to absorb light emitted through the side surface of the liquid crystal panel.

According to another embodiment of the present invention, the side surface of the liquid crystal panel may be coated with a sealing member to block light emitted through the side surface of the liquid crystal panel.

According to another embodiment of the present invention, the liquid crystal panel may be formed by bonding an upper substrate and a lower substrate facing each other to each other, wherein the sealing member may overflow toward the rear surface of the liquid crystal panel to seal a side surface of the lower substrate or cover the side surface of the liquid crystal panel and a side surface of the bonding member together.

According to another embodiment of the present invention, the liquid crystal panel may further include an upper polarizing member on a front surface of the display device, wherein the upper polarizing member may cover the side surface of the liquid crystal panel.

According to another embodiment of the present invention, the liquid crystal panel may include a diffused reflection pattern on at least one of the side surface and the edge of the rear surface.

According to another embodiment of the present invention, the diffused reflection pattern may be at least one of an embossed or engraved dot pattern, a serration pattern, and a pyramid pattern.

According to another embodiment of the present invention, the bonding member may be a conductive foam pad and be connected to a metal member included in the display device via a conductive tape.

According to another embodiment of the present invention, the metal member may be a rear cover configured to define an outer appearance of a rear surface of the display device.

According to another embodiment of the present invention, the bezel area may have a width of 3 to 6 mm.

According to another embodiment of the present invention, the liquid crystal panel may be formed by bonding an upper substrate and a lower substrate facing each other to each other, the lower polarizing member being arranged on a rear surface of the lower substrate, wherein the bonding member may be provided in the bezel area, wherein a width by which the bonding member contacts the lower substrate may be greater than or equal to two-thirds of a width of the bezel area, and a width by which the bonding member overlaps the lower polarizing member may be greater than or equal to half a width by which the lower polarizing member and the bezel area overlaps each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a partial cross-sectional view conceptually illustrating a liquid crystal module of a case top structure type, taken along line X-X' of FIG. 2;

FIG. 5 is a partial cross-sectional view conceptually illustrating a cinema-type liquid crystal module, taken along line X-X' of FIG. 2:

FIG. 8 is a partial front view illustrating leakage of light that may occur in the display device:

FIG. 14 is a partial cross-sectional view illustrating a display device according to another embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, various embodiments according to the present invention are explained with reference to attached drawings.

Figure 1:
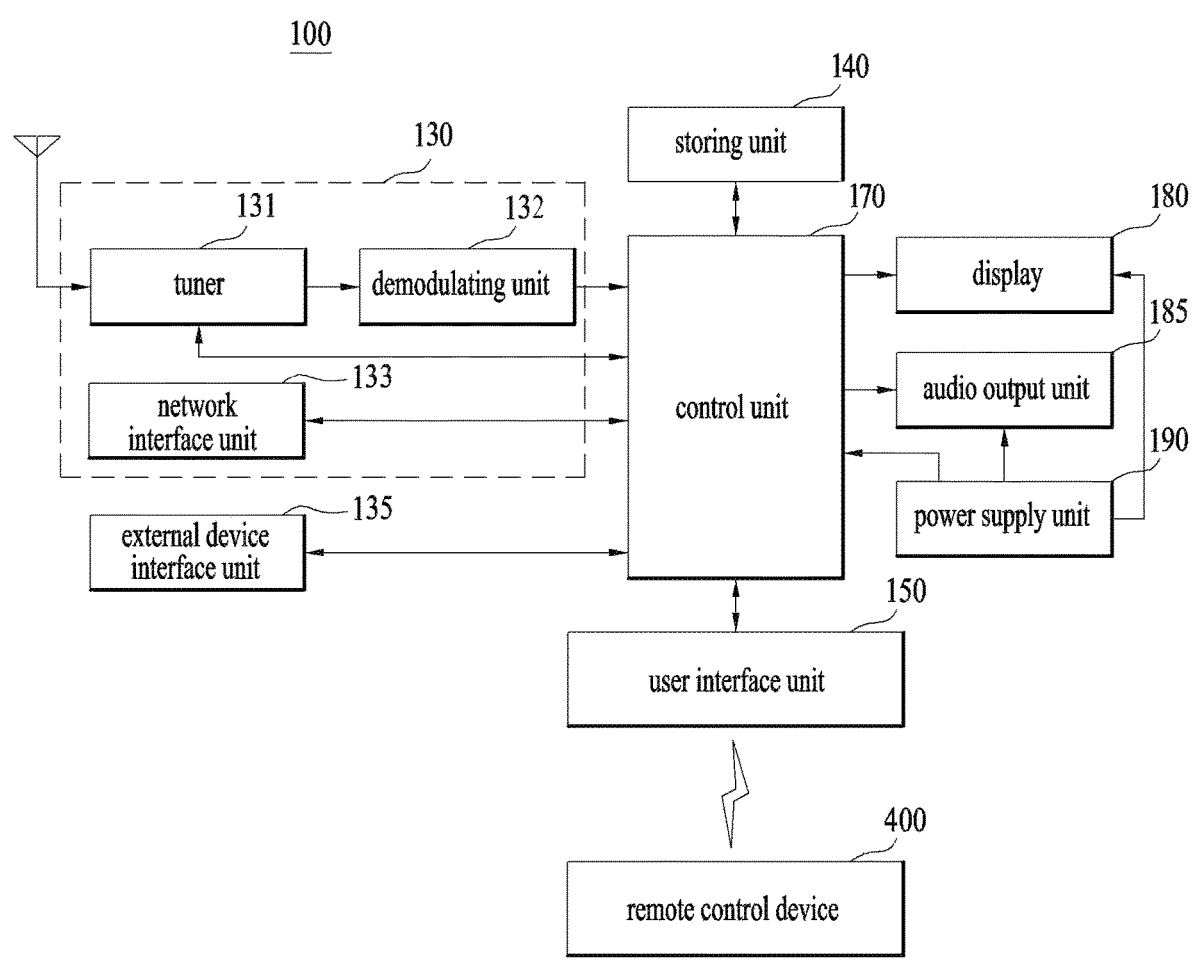
FIG. 1 is a block diagram illustrating the configuration of a display device.

FIG. 1 is a block diagram illustrating the configuration of a display device:

Referring to FIG. 1, an exemplary digital device 100 according to the present invention may include a broadcast receiving unit 130, an external device interface 135, a storage unit 140, a user input interface 150, a controller 170, a display unit 180, an audio output unit 185, a power supply unit 190, and a photographing unit (not shown). The broadcast receiving unit 130 may include at least one of one or more tuner 131, a demodulator 132, and a network interface 133. The broadcast receiving unit 130 may include the tuner 131 and the demodulator 132 without the network interface 133, or may include the network interface 133 without the tuner 131 and the demodulator 132. The broadcast receiving unit 130 may include a multiplexer (not shown) to multiplex a signal, which is subjected to the tuner 131 and demodulated by the demodulator 132, and a signal received through the network interface. In addition, the broadcast receiving unit 130 can include a demultiplexer (not shown) and demultiplex a multiplexed signal, a demodulated signal, or a signal received through the network interface 133.

The tuner 131 may receive a radio frequency (RF) broadcast signal by tuning to a channel selected by the user from among RF broadcast signals received through an antenna or all previously stored channels.

The demodulator 132 may receive a digital IF (Intermediate Frequency) signal (DIF) converted by the tuner 131 and demodulate the DIF signal.

A stream signal output from the demodulator 132 may be input to the controller 170. The controller 170 can control demultiplexing, audio/video signal processing, etc. Furthermore, the controller 170 can control output of an image through the display unit 180 and output of audio through the audio output unit 185.

The external device interface 135 may provide an environment for interfacing external devices with the digital receiver 400. To implement this, the external device interface 435 may include an A/V input/output unit (not shown) or an RF communication unit (not shown).

The external device interface 135 can be connected with external devices such as a digital versatile disk (DVD), a Blu-ray player, a game device, a camera, a camcorder, a computer (Weather computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 100 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 133 may provide an interface for connecting the digital device 100 to wired/wireless networks.

Using the network interface 133, the digital receiver can transmit/receive data to/from other users or other electronic apparatuses or access a predetermined web page through a network connected thereto or another network linked to the connected network.

The network interface 133 can selectively receive a desired application from among publicly open applications through a network.

The storage unit 140 may store programs for signal processing and control and store a processed video, audio or data signal.

In addition, the storage unit 140 may execute a function of temporarily storing a video, audio or data signal input from the external device interface 135 or the network interface 133. The storage unit 140 may store information about a predetermined broadcast channel through a channel memory function.

The storage unit 140 can store an application or a list of applications input from the external device interface 135 or the network interface 133. The storage unit 140 may store various platforms which will be described later. The storage unit 140 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 1 illustrates an embodiment in which the storage unit 140 is separated from the controller 170, the configuration of the digital receiver 100 is not limited thereto and the storage unit 140 may be included in the controller 170.

The user input interface 150 may transmit a signal input by the user to the controller 170 or deliver a signal output from the controller 170 to the user.

For example, the user input interface 150 can receive control signals such as a power on/off signal, a channel selection signal, an image setting signal, etc. from the remote controller 400 or transmit control signals of the controller 170 to the remote controller 400 according to various communication schemes such as RF communication, IR communication, and the like.

The user input interface 150 can transmit control signals input through a power key, a channel key, a volume key, and a local key (not shown) of a set value to the controller 170.

The user input interface 150 can transmit a control signal input from a sensing unit (not shown) which senses a gesture of the user or deliver a signal of the controller 170 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 170 can generate and output a signal for video or audio output by demultiplexing streams input through the tuner 131, the demodulator 132 or the external device interface 135 or processing demultiplexed signals.

A video signal processed by the controller 170 can be input to the display unit 380 and displayed as an image through the display unit 180. In addition, the video signal processed by the controller 170 can be input to an external output device through the external device interface 135.

An audio signal processed by the controller 170 can be applied to the audio output unit 185. Otherwise, the audio signal processed by the controller 170 can be applied to an external output device through the external device interface 135.

The controller 170 may include a demultiplexer and an image processor, which are not shown in FIG. 1.

The controller 170 can control the overall operation of the digital receiver 300. For example, the controller 170 can control the tuner 131 to tune to an RF broadcast corresponding to a channel selected by the user or a previously stored channel.

The controller 170 can control the digital device 100 according to a user command input through the user input interface 150 or an internal program. Particularly, the controller 170 can control the digital device 100 to be linked to a network to download an application or application list that the user desires to the digital device 100.

For example, the controller 170 may control the tuner 131 to receive a signal of a channel selected in response to a predetermined channel selection command received through the user input interface 150. In addition, the controller 170 may process a video, audio or data signal corresponding to the selected channel. The controller 170 may control information on a channel selected by the user to be output with a processed video or audio signal through the display unit 180 or the audio output unit 185.

Alternatively, the controller 170 may control a video signal or an audio signal received from an external apparatus, for example, a camera or a camcorder through the external device interface 135 to be output through the display unit 180 or the audio output unit 185 according to an external device image reproduction command received through the user input interface 150.

The controller 170 can control the display unit 180 to display images. For example, the controller 170 can control a broadcast image input through the tuner 131, an external input image received through the external device interface 135, an image input through the network interface 130, or an image stored in the storage unit 140 to be displayed on the display unit 180. Here, an image displayed on the display unit 180 can be a still image or video, and it can be a 2D or 3D image.

The controller 170 can control reproduction of content. Here, the content may be content stored in the digital device 100, received broadcast content, or content input from an external device. The content may include at least one of a broadcast image, an external input image, an audio file, a still image, an image of a linked web, and a text file.

The controller 170 can control display of applications or an application list, downloadable from the digital device 100 or an external network, when an application view menu is selected.

The controller 170 can control installation and execution of applications downloaded from an external network in addition to various user interfaces. Furthermore, the controller 170 can control an image relating to an application executed by user selection to be displayed on the display unit 180.

The digital device 100 may further include a channel browsing processor (not shown) which generates a thumbnail image corresponding to a channel signal or an external input signal.

The channel browsing processor can receive a stream signal (e.g., TS) output from the demodulator 132 or a stream signal output from the external device interface 135 and extract an image from the received stream signal to generate a thumbnail image. The generated thumbnail image can be directly input to the controller 170 or can be encoded and then input to the controller 170. Also, the thumbnail image can be coded into a stream and then applied to the controller 170. The controller 170 can display a thumbnail list including a plurality of thumbnail images on the display unit 180 using thumbnail images input thereto. The thumbnail images included in the thumbnail list can be updated sequentially or simultaneously. Accordingly, the user can conveniently check content of a plurality of broadcast channels.

The display unit 180 may convert a video signal, a data signal, and an OSD signal processed by the controller 170 and a video signal and a data signal received from the external device interface 135 into RGB signals to generate driving signals. The display unit 480 may be a PDP, an LCD, an OLED, a flexible display, a 3D display or the like. The display unit 180 may be configured as a touch-screen and used as an input device rather than an output device. The audio output unit 185 receives a signal audio-processed by the controller 170, for example, a stereo signal, a 3.1 channel signal or a 5.1 channel signal, and outputs the received signal as audio. The audio output unit 185 can be configured as one of various speakers.

The digital device 100 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 170 through the user input interface 150. The digital device 100 may further include the photographing unit (not shown) for photographing the user. Image information acquired by the photographing unit (not shown) can be supplied to the controller 170. The controller 170 may sense a gesture of the user from an image captured by the photographing unit (not shown) or a signal sensed by the sensing unit (not shown), or by combining the image and the signal.

The power supply unit 190 may supply power to the digital device 100. Particularly, the power supply unit 190 can supply power to the controller 170 which can be implemented as a system-on-chip (SoC), the display unit 180 for displaying images, and the audio output unit 185 for audio output.

The remote controller 400 may transmit user input to the user input interface 150. To achieve this, the remote controller 400 can use Bluetooth, RF communication, IR communication, UWB, ZigBee, etc. In addition, the remote controller 400 can receive audio, video or data signal output from the user input interface 150 and display the received signal or output the same as audio or vibration.

Figure 2:
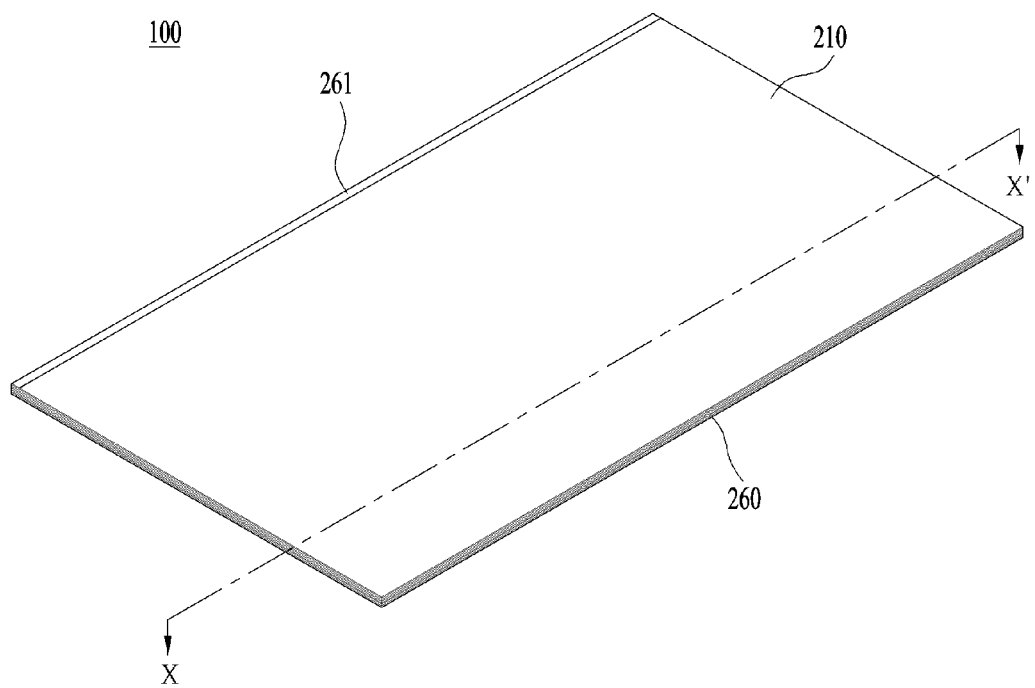
FIG. 2 is a perspective view illustrating the display device.
Figure 3:
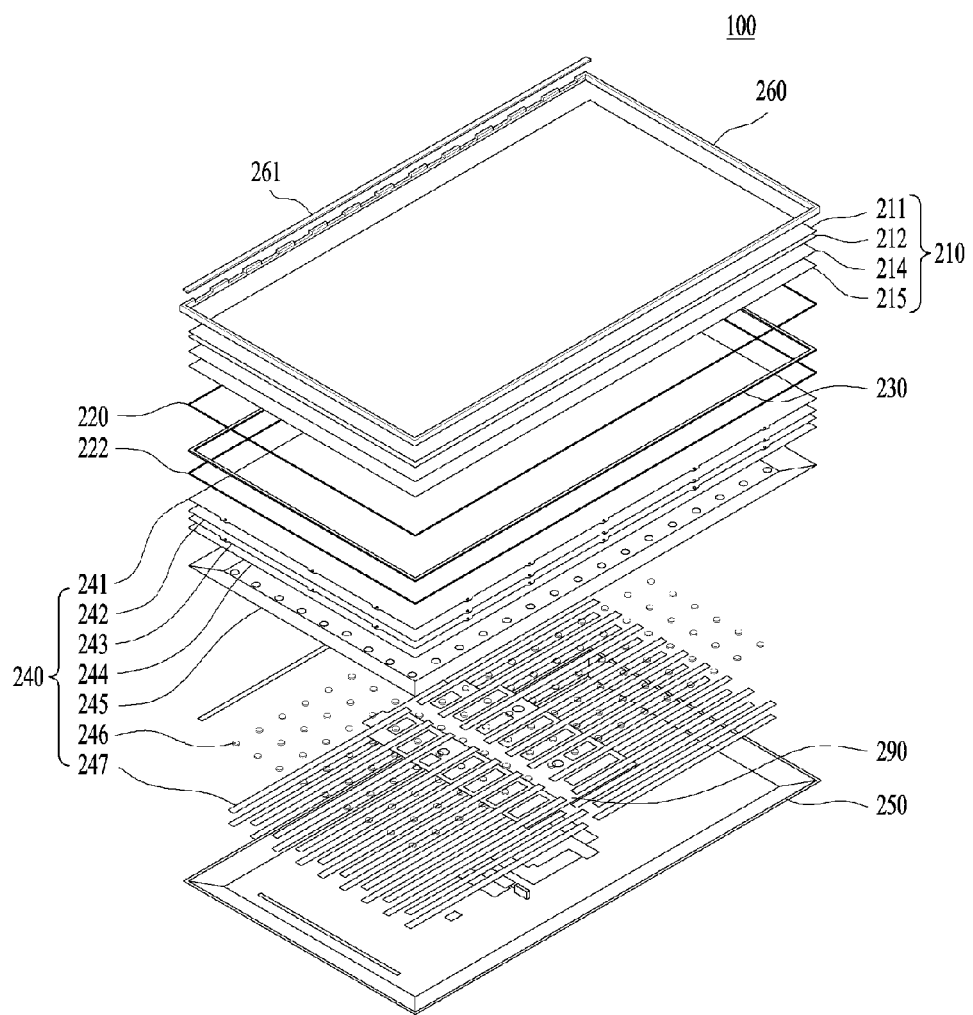
FIG. 3 is an exploded view illustrating the display device of FIG. 2.

FIG. 2 is a perspective view illustrating the display device 100, and FIG. 3 is an exploded view illustrating the display device 100 of FIG. 2

The display device 100 may include a liquid crystal panel 210 configured to output an image signal, a bonding member 220, and a panel guide 230 by which the edge of the liquid crystal panel 210 is supported, a backlight unit 240 configured to emit light toward the rear surface of the liquid crystal panel 210, a cover bottom 250, and a case top 260, as elements corresponding to the display module 180 of FIG. 1.

The liquid crystal panel 210 may display a predetermined image by adjusting the transmittance of light emitted from the backlight unit 24). To this end, the liquid crystal display panel 210 may include an upper polarizing member 211, a color filter array substrate 212, a thin film transistor (TFT) array substrate 214, and a lower polarizing member 215.

Hereinafter, layers through which light emitted from the backlight unit 240 sequentially passes will be described to explain operation of the liquid crystal panel 210.

The lower polarizing member 215 is a film capable of passing or blocking vertically or horizontally polarized waves of incident light separately. The light passing through the lower polarizing member 215 may be vertically or horizontally polarized.

The TFT array substrate 214 serves to change the polarization direction of the polarized light passing through the lower polarizing member 215 to adjust brightness of RGB pixels provided on the color filter array substrate 212. Specifically, the TFT array substrate 214 is formed in a matrix of a plurality of gate lines and a plurality of data lines, and thin film transistors (TFTs) are formed at the intersections of the gate lines and the data lines.

A signal voltage transmitted from a driver circuit to the TFT array substrate 214 may be applied between a pixel electrode and a common electrode of the color filter array substrate 212 through a TFT, and thus the liquid crystals between the pixel electrode and the common electrode are aligned according to the signal voltage to determine the transmittance of light. That is, an external electric field may be applied to the TFT array substrate 214 to manipulate the molecular arrangement of the liquid crystals (not shown) and change the polarization direction of the polarized light passing through the liquid crystals (not shown).

The color filter array substrate 212 may include RGB pixels (not shown). The RGB pixels (not shown) may implement colors by passing only light in a specific wavelength range in the white light emitted from the backlight unit 240. Here, the RGB pixels (not shown) may be formed in a black matrix that serves as a partition for preventing colors from being mixed.

Specifically, each RGB pixel may be provided at a corresponding position in the black matrix, which is a checkerboard-shaped barrier, and rays of light passing through RGB pixels may be combined to form a color. The liquid crystal panel 210 may include an active area A for outputting an image signal and a bezel area B arranged at an edge of the active area A (see FIG. 4). Light emitted from the backlight unit 240 is not transmitted through the bezel area B. The active area A may include RGB pixels and the bezel area B may include a black matrix 213 (see FIG. 4) without RGB pixels.

The upper polarizing member 211 may be a film capable of passing or blocking vertically or horizontally polarized waves of incident light separately, as in the case of the lower polarizing member 215. The polarization direction of incident light in the upper polarizing member 211 may be different from that in the lower polarizing member 215. That is, when the incident light is vertically polarized by the lower polarizing member 215, the upper polarizing member 211 may horizontally polarize the incident light. Accordingly, if the liquid crystals are not controlled through the TFT array substrate 214, light passing through the lower polarizing member 215 may fail to pass through the upper polarizing member 211. That is, the TFT array substrate 214 may adjust the amount of light passing through the upper polarizing member 211 by controlling the liquid crystals.

The bonding member 220 is a member that bonds the liquid crystal panel 210 to the panel guide 230 and may fix the edge of the rear surface of the liquid crystal panel 210 to the panel guide 230. In some cases, a bonding member 222 may be further provided as a member for bonding the panel guide 230 to the backlight unit.

The panel guide 230 is a structure provided along the edge of the liquid crystal panel 210 to support the liquid crystal panel 210. The panel guide 230 supports the edge of the rear surface of the liquid crystal panel 210. In some cases, the panel guide 230 may cover the side surface of the liquid crystal panel 210. The shape of the panel guide 230 may depend on a liquid crystal module (LCM) for fixing the liquid crystal panel 210. FIG. 3 shows an embodiment in which the case top 260 defines an outer appearance. In recent years, a cinema-type LCM in which the panel guide 230 defines the outer appearance is preferred. Relevant details will be described with reference to FIGS. 4 and 5.

The backlight unit 240, which is configured to emit light to the rear surface of the liquid crystal panel 210, may include a protective sheet 241, a prism sheet 242, diffusion sheets 243 and 244, a reflection plate 245, a light source unit 246, and a circuit board 247. Unlike the organic light emitting diodes (OLEDs), the liquid crystals do not self-generate light, and thus the backlight unit 240 that provides light may be needed to see the screen.

While FIG. 2 illustrates that the light source unit 246 emits light directly to the rear surface of the liquid crystal panel 210, light may be emitted toward the rear surface of the liquid crystal panel 210 using a light guide plate that has the light source unit 246 on the side surface thereof.

A structure in which light is emitted using the light guide plate will be described in detail. The light guide plate may be a plastic sheet engraved with a concave-convex pattern that reflects light in a specific direction. The light guide plate may be arranged parallel to the rear surface of the liquid crystal panel 210, and convert light emitted into the light guide plate by the light source unit 246, which is provided on the side surface of the light guide plate, into planar light such that the planar light is emitted to the rear surface of the liquid crystal panel 210.

When the light guide plate is used to emit light, the display device may be designed to be slim. Polymethylmethacrylate (PMMA), which has high rigidity and is less likely to be deformed or broken, and has high transmittance, may be used as a material of the light guide plate.

The protective sheet 241 may be located at the uppermost position in the backlight unit 240 to protect the prism sheet 242, which is fragile to scratches.

The prism sheet 242 may serve to condense light diffused by the diffusion sheets 243 and 244 in a direction perpendicular to the liquid crystal panel 210 arranged over the prism sheet 242. In some cases, two or three prism sheets 242 may be arranged to overlap each other.

The diffusion sheets 243 and 244 may serve to diffuse light from the light source unit 246 and uniformly supply the light to the rear surface of the liquid crystal panel 210. While FIG. 2 illustrates that two diffusion sheets are used, one diffusion sheet or three or more diffusion sheets may be employed.

The reflection plate 245 may serve to enhance light efficiency by condensing the light emitted from the light source unit 246. That is, when the light scattered from the light source unit 246 can be reused, the reflection plate may be called a dual brightness enhancement film (DBEF). The DBEF may increase the axial brightness such that more light can be transmitted forward. Typically, a BEF may increase the brightness by 40% to 60%. In some cases, two BEFs may be used to transmit enhanced brightness.

The light source unit 246, which is an element configured to generate and emit light, may employ one of a cathode fluorescent lamp (CCFL), an external electrode fluorescent lamp (EEEL), and a light emitting diode (LED).

When the LED is used as the light source unit 246, the thickness of the panel and power consumption may be reduced, and heat dissipation may be facilitated. In addition, the display may become brighter, and contrast may be enhanced.

One or more light source units 246 may be provided. Each of the light source units 246 may be connected to and controlled by the circuit board 247.

The cover bottom 250 may form the rear surface of the display device 100 and define an accommodation space in which the backlight unit 240 is accommodated. The accommodation space defined by the cover bottom 250 may contain a circuit board 290 corresponding to the controller 170 in FIG. 1.

The case top 260, which is a structure that covers the side surface of the liquid crystal panel 210 and the edge of the front surface of the liquid crystal panel 210, may be fixed to the panel guide 230 and/or the cover bottom 250.

The front surface of the display device 100 may be provided with a user interface 150 (see FIG. 1) for bidirectional communication with a remote controller 400 (see FIG. 1). The display device 100 may include a separate side case 261 for covering the user interface 150.

Various case structures may be used to fix the liquid crystal panel 210. The display device 100 may involve a different issue depending on the case structure, and will be described in detail below.

FIG. 4 is a partial cross-sectional view conceptually illustrating a liquid crystal module of a case top structure type, taken along line X-X' of FIG. 2.

FIG. 4(*a*) shows a case top structure type LCM, and FIG. 4(*b*) is a view illustrating leakage of light occurring when the case top 260 is removed from the case top structure type LCM.

The case top structure type LCM may be a structure in which the case top 260 covers the outer side surface of the panel guide 230 that supports the liquid crystal panel 210. That is, the case top 260 may define the outer appearance of the display device 100.

Specifically, the panel guide 230 may include a seating portion 231 on which an edge of the rear surface of the liquid crystal panel is seated and a sidewall portion 232 configured to cover the side surface of the liquid crystal panel. The case top 260 may cover the outer side surface of the panel guide 230 and have an end curved inward to cover a gap between the liquid crystal panel 210 and the sidewall portion 232.

The case top 260 may prevent light leaking through the gap between the liquid crystal panel 210 and the sidewall portion 232 from being recognized by the user. Hereinafter, light that leaks through the gap between the liquid crystal panel 210 and the sidewall portion 232 and is recognized by the user will be discussed.

The liquid crystal panel 210 may include the upper polarizing member 211, the color filter array substrate 212, the TFT array substrate 214, and the lower polarizing member 215, as described with reference to FIGS. 2 and 3.

The liquid crystal panel 210 may be divided into an active area A where images are implemented and a bezel area B provided at the edge of the active area A. FIG. 4 shows a black matrix 213 corresponding to the bezel area B.

The black matrix 213 may also be provided in the active area A. The black matrix 213 provided in the active area A serves as a barrier separating the RGB pixels. The black matrix 213 provided in the bezel area B does not include any RGB pixel, but serves to reflect the incident light from the rear surface to prevent the light from being transmitted to the front surface.

Light emitted from the backlight unit 240 and incident on the rear surface of the liquid crystal panel 210 travels along the liquid crystal panel 210 (specifically, along the TFT array substrate 214) and leaks through the side surface of the liquid crystal panel 210. The leaking light may be reflected by the sidewall portion 232 and recognized through the gap between the liquid crystal panel 210 and the sidewall portion 232.

The gap between the liquid crystal panel 210 and the sidewall portion 232 may be formed outside the bezel area B to form a bright light band, which will be described in detail with reference to FIG. 8.

The light that leaks along the liquid crystal panel 210 may be divided into light having passed through the lower polarizing member 215 and light incident on the gap between the lower polarizing member 215 and the bonding member 220. In this regard, the structure in which the liquid crystal panel 210 and the bonding member 220 contact each other needs to be considered.

The TFT array substrate 214 may be formed by laminating a transistor layer onto a glass substrate. It may be advantageous in terms of adhesion that the bonding member 220 is arranged in direct contact with the lower substrate 214, which is a glass substrate, rather than with the lower polarizing member 215.

The lower polarizing member 215 may be provided on the rear surface of the TFT array substrate 214 except for the edge of the rear surface of the TFT array substrate 214, and the bonding member 220 may be bonded directly to the edge of the rear surface of the TFT array substrate 214.

In this case, however, a gap C may be produced between the lower polarizing member 215 and the bonding member 220, and the light incident on the gap C between the lower polarizing member 215 and the bonding member 220 may be light that is not polarized.

That is, the light leaking along the liquid crystal panel 210 may include both light polarized through the lower polarizing member 215 and light that is incident on the gap C between the lower polarizing member 215 and the bonding member 220 and is not polarized.

In the case top structure type LCM, even if light leaks through the side surface of the liquid crystal panel 210, the case top 260 may prevent the leaking light from being visually recognized through the gap between the liquid crystal panel 210 and the sidewall portion 232. Accordingly, it may not be a problem that light leaking through the side surface of the liquid crystal panel 210.

However, the case top structure type LCM may increase the weight of the display device due to the added elements and increase the thickness of the display device due to the element covering the edge of the liquid crystal panel 210

Thus, in recent years, a cinema-type LCM that defines the outer appearance with the panel guide 230 by removing the case top 260 is preferred for lightweight and thin design of the display device.

However, the cinema-type LCM may not prevent the light leaking through the side surface of the liquid crystal panel from being visually recognized. Accordingly, the cinema-type LCM employs a separate liquid crystal panel dedicated to cinemas (a liquid crystal panel having a sealed edge), which will be described in detail below.

FIG. 5 is a partial cross-sectional view conceptually illustrating a cinema-type LCM, taken along line X-X' of FIG. 2.

FIG. 5(*a*) shows a cinema-type LCM, and FIG. 5(*b*) illustrates leakage of light that occurs when a sealing member 270 is removed from the cinema-type LCM.

FIG. 5 is a partial cross-sectional view illustrating a cinema-type LCM, which will be described focusing on the differences from the case top structure LCM of FIG. 4.

Unlike the LCM of the case top structure, the cinema-type LCM does not have the case top 260 (see FIG. 4), and thus the panel guide 230 defines the outer appearance of the display device.

The cinema-type LCM does not include a separate structure (e.g., the case top 260) for blocking the light leaking through the side surface of the liquid crystal panel 210, and thus it is necessary to prevent light from leaking through the side surface of the liquid crystal panel 210. On the other hand, the case top structure type LCM of FIG. 4 has the case top 260 to prevent leaking light from being visually recognized, and accordingly it is not necessary to prevent light from leaking through the side surface of the liquid crystal panel 210.

That is, the cinema-type LCM may further include a sealing member 270 for sealing the side surface of the liquid crystal panel 210 to prevent light from leaking through the side surface of the liquid crystal panel 210.

In other words, unlike the case top structure type LCM, the cinema-type LCM does not prevent light leaking through the side surface of the liquid crystal panel 210 from being visually recognized in the front, but prevents light from leaking through the side surface of the liquid crystal panel 210 by sealing the side surface of the liquid crystal panel 210.

As the cinema-type LCM of FIG. 5 includes the sealing member 270 to cover the side surface of the liquid crystal panel 210, the panel guide 230 thereof may differ in shape from the panel guide 230 of FIG. 4.

The cinema-type LCM may need a space in which the side surface of the liquid crystal panel 210 is covered with the sealing member 270. The sealing member 270 may form the side surface of the liquid crystal panel 210 to be rounded and serve to absorb shock. Accordingly, in contrast with the example of FIG. 4, the sidewall portion 232 of the panel guide 230 of FIG. 5 does not need to extend to the side surface of the liquid crystal panel 210.

However, since the cinema-type LCM employs the dedicated liquid crystal panel 210 that is separately manufactured, the cinema-type LCM may increase the manufacturing process time and costs.

Hereinafter, in order to address the issue of the cinema-type LCM, a structure that may prevent light from leaking through the side surface of the liquid crystal panel 210 without providing the sealing member 270 in the cinema-type LCM will be described.

Figure 6:
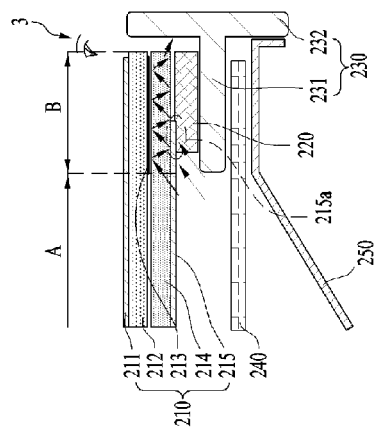
FIG. 6 is a partial cross-sectional view conceptually illustrating a display device according to one embodiment of the present invention, taken along line X-X' of FIG. 2.

FIG. 6 is a partial cross-sectional view conceptually illustrating a display device according to one embodiment of the present invention, taken along line X-X' of FIG. 2.

Specifically, FIG. 6 is a partial cross-sectional view illustrating a display device including a cinema-type LCM a according to the present invention, which will be described below focusing on the differences from the LCM of FIGS. 4 and 5.

As discussed above with reference to FIG. 4, light leaking through the side surface of the liquid crystal panel 210 may include light having passed through the lower polarizing member 215 and light incident on the gap C (see FIG. 4) between the lower polarizing member 215 and the bonding member 220.

Specifically, the light having passed through the lower polarizing member 215 and the light incident on the gap C between the lower polarizing member 215 and the bonding member 220 may be reflected inside the liquid crystal panel 210 and leak through the side surface of the liquid crystal panel 210.

At this time, since the lower polarizing member 215 allows only one polarized component to pass therethrough and absorbs or reflects the other component, the intensity of the light having passed through the lower polarizing member 215 may be reduced as the light is reflected inside the liquid crystal panel 210. Accordingly, the amount of the light leaking through the side surface of the liquid crystal panel 210 may be insignificant.

However, the light incident on the gap C between the lower polarizing member 215 and the bonding member 220 comes from all directions. Accordingly even if the light is reflected inside the liquid crystal panel 210, the intensity thereof is rarely reduced and may thus constitute most of the intensity of the light leaking through the side surface of the liquid crystal panel 210. Therefore, in order to prevent leakage of light through the side surface of the liquid crystal panel 210, it is necessary to block light incident on the gap C between the lower polarizing member 215 and the bonding member 220.

Thus, the display device according to the present invention may include a liquid crystal panel 210 including an active area A in which an image is output and a bezel area B positioned around the active area A, a backlight unit 240 configured to emit light to the rear surface of the liquid crystal panel 210, a panel guide 230 including a seating portion 231 on which an edge of the rear surface of the liquid crystal panel 210 is seated and a sidewall portion 232 configured to cover the side surface of the liquid crystal panel 10, a bonding member 220 provided in the bezel area B and configured to bond the edge of the rear surface of the liquid crystal panel 210 to the seating portion 231, and a lower polarizing member 215 constituting the rear surface of the liquid crystal panel 210 and having an edge overlapping a part of the front surface of the bonding member 220.

Referring to FIG. 6, in the display device according to the present invention, the lower polarizing member 215 may define the rear surface of the liquid crystal panel 210 and include a portion 215a whose edge overlaps the front surface of the bonding member 220.

That is, as the lower polarizing member 215 includes the portion 215a overlapping the front surface of the bonding member 220, the display device according to the present invention may prevent the gap C from being formed between the lower polarizing member 215 and the bonding member 220.

Accordingly, light leaking through the side surface of the liquid crystal panel 210 is light that has passed through the lower polarizing member 215, and light that has not passed through the lower polarizing member 215 may not leak through the side surface of the liquid crystal panel 210.

Further, in the display device according to the present invention, the panel guide 230 includes the sidewall portion 231 configured to cover the side surface of the liquid crystal panel 210, and accordingly the intensity of the light leaking through the side surface of the liquid crystal panel 210 may be reduced as the leaking light is reflected on the sidewall portion 231.

That is, in the display device according to the present invention, only light polarized through the lower polarizing member 215 may be reflected inside the liquid crystal panel 210 and leak through the side surface of the liquid crystal panel 210, and the light that is not polarized may be prevented from leaking through the side surface of the liquid crystal panel 210.

The intensity of light leaking through the side surface of the liquid crystal panel 210 is lowered while the light is reflected inside the liquid crystal panel 210, particularly, in the bezel area B.

Accordingly, when the bezel area B is wide, light may not leak through the side surface of the liquid crystal panel 210, and thus the present invention may be effective in a case where the width of the bezel area B is small.

Thus, the display device of the present invention described in FIG. 6 may be applied to a case where the bezel area B has a width of 3 mm to 6 mm.

However, when the width of the bezel area B is reduced, the area of contact between the liquid crystal panel 210 and the bonding member 220 may be reduced, which may lead to an issue related to adhesion by which the liquid crystal panel 210 is fixed to the panel guide 230.

The width by which the bonding member 220 and the lower polarizing member 215 overlap each other may be determined in consideration of adhesion of the bonding member 220, which will be described in detail with reference to FIG. 7.

Figure 7:
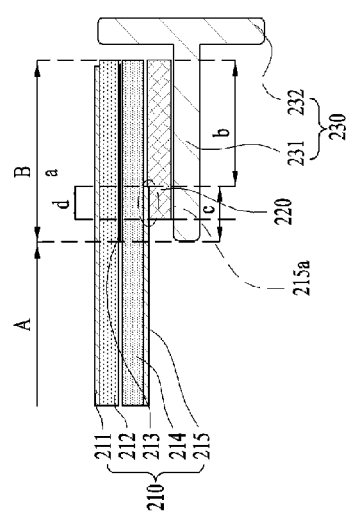
FIG. 7 is a view illustrating the proportion of a bonding member attached to the liquid crystal panel in the display device of FIG. 6.

FIG. 7 is a view illustrating the proportion of the bonding member 220 attached to the liquid crystal panel 210 in the display device of FIG. 6.

The liquid crystal panel 210 may be formed by bonding an upper substrate (the color filter array substrate 212) and a lower substrate (the TFT array substrate 214) facing each other, and the lower polarizing member 215 may be arranged on the rear surface of the lower substrate 214, thereby constituting a part of the rear surface of the liquid crystal panel.

Here, the lower substrate (the TFT array substrate 214) may be formed by laminating a transistor layer onto a glass substrate. It may be advantageous in terms of adhesion that the bonding member 220 is arranged in direct contact with the lower substrate 214, which is a glass substrate, rather than with the lower polarizing member 215.

That is, even when the bonding member 220 partially overlaps the lower polarizing member 215 to prevent light from leaking through the side surface of the liquid crystal panel 210, it is advantageous in terms of adhesion that the bonding member 220 has a sufficient surface to be bonded to the lower substrate 214.

Thus, the bonding member 220 may be provided in the bezel area B and the width b by which the bonding member 220 contacts the lower substrate 214 may be greater than or equal to two-thirds of the width a of the bezel area B.

The bonding member 220 may be provided in the bezel area B because the bonding member 220 bonds the liquid crystal panel 210 to the seating portion 231 that supports the edge of the liquid crystal panel 210.

In addition, the bonding member 220 may contact the edge of the rear surface of the lower substrate 214 and be attached thereto such that the side surface of the lower substrate 214 and the side surface of the bonding member 220 are in the same plane.

In this case, the bonding member 220 may overlap the lower polarizing member 215 by a width d which is greater than or equal to half the width c by which the lower polarizing member 215 overlaps the bezel area B.

Specifically, as the bonding member 220 is provided in the bezel area B, the width c by which the bonding member 220 overlaps the lower polarizing member 215 may be greater than or equal to half the width c by which the lower polarizing member 215 overlaps the bezel area B and be less and equal to the width c by which the lower polarizing member 215 overlaps the bezel area B.

FIG. 8 is a partial front view illustrating leakage of light that may occur in the display device.

Specifically, FIG. 8 is a partial front view of an edge portion of the display device having a cinema-type liquid crystal module.

FIG. 8(a) illustrates a case where the lower polarizing member 215 and the bonding member 220 do not overlap each other in the display device according to FIG. 6, and FIG. 8(b) illustrates a case where the lower polarizing member 215 includes a portion 215a which overlaps the bonding member 220 in the display device according to FIG. 6.

The bezel area B, which is formed at the edge of the active area A where the image is output, is an area through which light is not transmitted. When light leaks through the side surface of the liquid crystal panel 210, a light band 280a may be formed at the edge of the bezel area B.

That is, when light leaks through the side surface of the liquid crystal panel 210, the light band 280a may be formed between the bezel area B and the panel guide 230 by the light leaking through the side surface of the liquid crystal panel 210.

The present invention is intended to prevent light from entering the gap C (see FIG. 5) between the bonding member 220 and the lower polarizing member 215 to prevent light from leaking through the side surface of the liquid crystal panel 210 and prevent the light band 280a from being formed by the light leaking through the side surface of the panel 210.

That is, light leaking through the side surface of the liquid crystal panel 210 includes light having passed through the lower polarizing member 215 and light incident on the gap C between the bonding member 220 and the lower polarizing member 215, and the present invention is intended to prevent light from entering the gap C between the bonding member 220 and the lower polarizing member 215.

However, in some cases, light having passed through the lower polarizing member 215 may leak through the side surface of the liquid crystal panel 210 to form a weak light band 280a as shown in FIG. 8(b).

The light passing through the lower polarizing member 215 may be polarized and be reflected inside the liquid crystal panel 210, and thus the intensity thereof may be sufficiently reduced. However, when the width of the bezel area B is reduced, the light band 280a may be formed.

Hereinafter, another embodiment of the present invention will be described in which leakage of light through the side surface of the liquid crystal panel 210 is further prevented.

Figure 9:
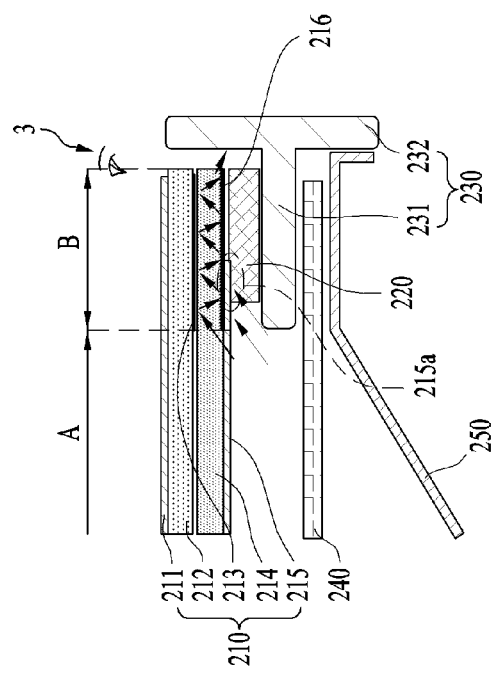
FIG. 9 is a partial cross-sectional view illustrating a display device according to another embodiment of the present invention.

FIG. 9 is a partial cross-sectional view illustrating a display device according to another embodiment of the present invention, which will be described focusing on the differences from the display device of FIG. 6.

The display device of FIG. 9 prevents the light having passed through the lower polarizing member 215 in the display device of FIG. 6 from leaking through the side surface of the liquid crystal panel 210.

In the display device of FIG. 9, the lower polarizing member 215 includes a portion 215a overlapping the bonding member 220, and all the light that is incident on the rear surface of the liquid crystal panel 210 from the backlight unit 240 and leaks through the side surface of the liquid crystal panel 210 may be light having passed through the lower polarizing member 215.

In this case, the liquid crystal panel 210 may further include an area 216 that is provided at the edge of the rear surface of the liquid crystal panel 210 corresponding to the bezel area B and is colored in black to block light incident from the backlight unit 240 and absorb light emitted toward the side surface along the liquid crystal panel 210.

Specifically, the black colored area 216 may be included in the edge of the rear surface of the lower substrate 214 and may overlap the lower polarizing member 215 and the bonding member 220.

The black colored area 216 may prevent light from entering the rear surface of the liquid crystal panel 210 in the bezel area B and reduce the intensity of light that is reflected inside the liquid crystal panel 210 and leaks through the side surface of the liquid crystal panel 210.

That is, the black colored area 216 may serve as a photosensitive agent that reflects the polarized light passing through the lower polarizing member 215 and reduces the intensity thereof.

The black colored area 216 may be arranged to have a width corresponding to the width of the bezel area B in order to widen an area where the intensity of light is reduced while the light is reflected inside the liquid crystal panel 210.

That is, as the black colored area 216 is arranged to have a width corresponding to the width of the bezel area B, the number of times the light to leak through the side surface of the liquid crystal panel 210 is reflected may increase, thereby reducing the intensity of the leaking light.

Figure 10:
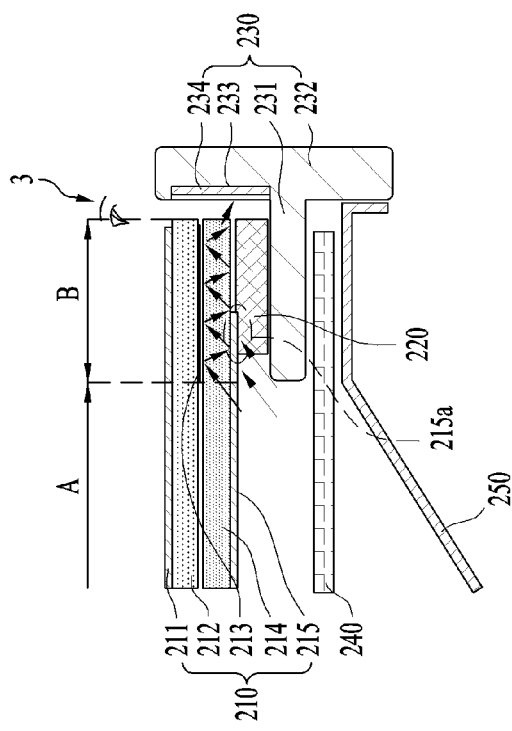
FIG. 10 is a partial cross-sectional view illustrating a display device according to another embodiment of the present invention.

FIG. 10 is a partial cross-sectional view illustrating a display device according to another embodiment of the present invention, and will be described focusing on the differences from the display device of FIG. 6.

The display device of FIG. 10 prevents the light having passed through the lower polarizing member 215 in the display device of FIG. 6 from leaking forward even if the light leaks through the side surface of the liquid crystal panel 210.

In the display device of FIG. 10, the lower polarizing member 215 includes a portion 215a overlapping the bonding member 220, and all the light that is incident on the rear surface of the liquid crystal panel 210 from the backlight unit 240 and leaks through the side surface of the liquid crystal panel 210 may be light having passed through the lower polarizing member 215.

In this case, the panel guide 230 may include a groove 233 provided in a surface of the sidewall portion 232 facing the side surface of the liquid crystal panel 210, and a matt tape 234 provided in the groove 233 to absorb light emitted through the side surface of the liquid crystal panel 210.

The matt tape 234 may absorb light leaking from the side surface of the liquid crystal panel 210 to prevent light from leaking into the gap between the liquid crystal panel 210 and the panel guide 230.

Figure 11:
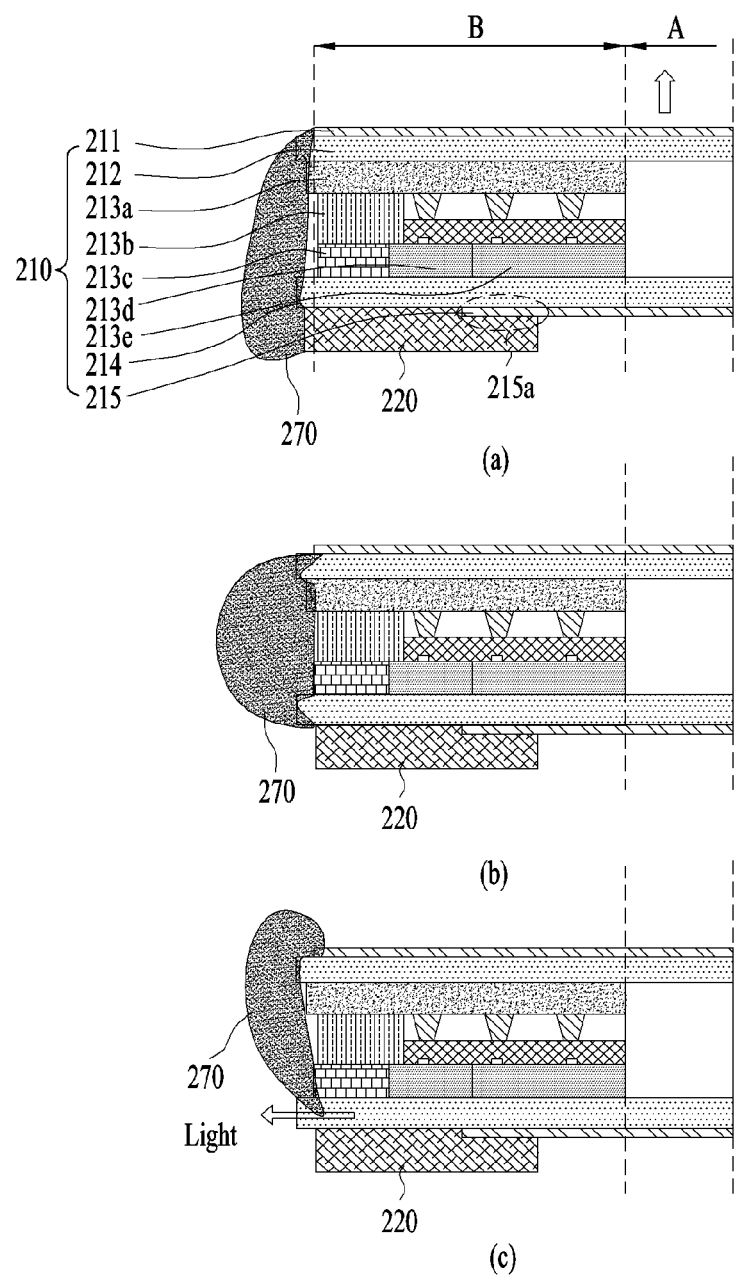
FIG. 11 is a partial cross-sectional view illustrating a display device according to another embodiment of the present invention.
Figure 12:
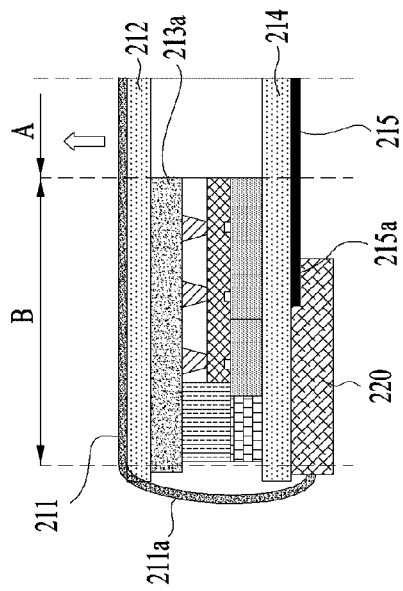
FIG. 12 is a partially enlarged view showing portion C of FIG. 11 in another direction.

FIG. 11 is a partial cross-sectional view illustrating a display device according to another embodiment of the present invention, and FIG. 12 is a partially enlarged view showing portion D of FIG. 11 in another direction. Hereinafter, the display device according to this embodiment will be described focusing on the differences from the display device of FIG. 6.

The display device of FIG. 11 prevents light having passed through the lower polarizing member 215 in the display device of FIG. 6 from leaking through the side surface of the liquid crystal panel 210.

In the display device of FIG. 11, the lower polarizing member 215 includes a portion 215a overlapping the bonding member 220, and all the light that is incident on the rear surface of the liquid crystal panel 210 from the backlight unit 240 and leaks through the side surface of the liquid crystal panel 210 may be light having passed through the lower polarizing member 215.

The liquid crystal panel 210 may include a diffused reflection pattern on at least one of a side surface and an edge of the rear surface of the liquid crystal panel 210. FIGS. 11 and 12 illustrate embodiments in which the side surface of the liquid crystal panel 210 includes diffused reflection patterns 214a, 214b, and 214c.

The diffused reflection patterns 214a, 214b, and 214c may block light from leaking through the side surface of the liquid crystal panel 210 by scattering light that is incident on the side surface of the liquid crystal panel 210 from the inside of the liquid crystal panel 210.

The diffused reflection patterns 214a. 214b and 214c may form a dot pattern 214a in a hemispherical shape as shown in FIG. 12(a). The dot pattern 214a may be embossed or engraved. The dot pattern does not necessarily have a hemispherical shape of a constant size, but may be composed of hemispherical projections or recesses of different sizes.

Further, the diffused reflection patterns 214a. 214b, and 214c may form a serration pattern 214b as shown in FIG. 12(b). The serration pattern 214b is a pattern in which V-shaped irregularities constituting crests and troughs are repeatedly formed. The height and size of each trough and each crest may be constant or may be irregularly variable.

Further, the diffused reflection patterns 214a. 214b, and 214c may form a pyramid pattern composed of humps of a pyramid shape 214c as shown in FIG. 12(c).

Figure 13:
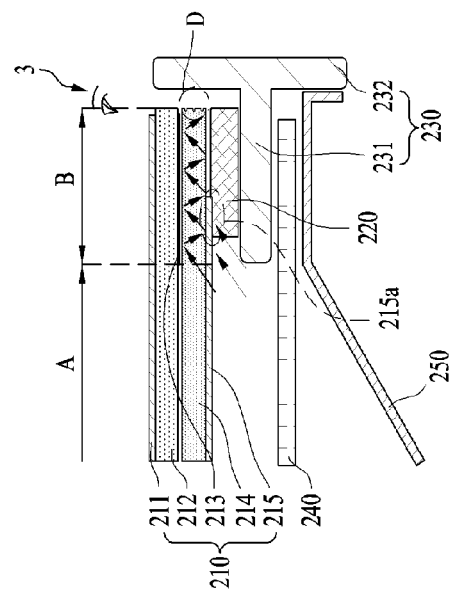
FIG. 13 is a partial cross-sectional view illustrating a display device according to another embodiment of the present invention.

FIG. 13 is a partial cross-sectional view illustrating a display device according to another embodiment of the present invention.

In the display device of FIG. 13, the lower polarizing member 215 includes a portion 215a overlapping the bonding member 220, and all the light that is incident on the rear surface of the liquid crystal panel 210 from the backlight unit 240 (see FIG. 6) and leaks through the side surface of the liquid crystal panel 210 may be light having passed through the lower polarizing member 215.

Here, the liquid crystal panel 210 may further include a sealing member 270 configured to seal the side surface of the liquid crystal panel 210.

The present invention employs a liquid crystal panel 210 that is not sealed on the side surface thereof and may reduce a cost for the sealing member for sealing the side surface of the liquid crystal panel 210 because only the light that passes through the lower polarizing member 215 and leaks needs to be blocked.

The sealing member 270 may seal the side surface of the liquid crystal panel 210 running from the color filter array substrate 212 to the TFT array substrate 214, and the side surface of the liquid crystal panel 210 covered by the sealing member 270 may be in the bezel area (B).

The bezel area B where the sealing member 270 covers the side surface may include a black matrix 213a, a bonding material 213b for bonding the upper and lower substrates of the liquid crystal panel 210, a ground GND, and a driving circuit 213e configured to drive a gate in forming a TFT substrate, and a circuit 213d (a current limiting reactor (CLX)) configured to sequentially drive the driving circuit 213e.

The sealing member 270 may not only serve to prevent light from leaking from the liquid crystal panel 210, but may also serve to protect the bezel area B from static electricity, which will be described in detail with reference to FIGS. 16 and 17.

FIG. 13(a) illustrates an embodiment in which the sealing member 270 overflows toward the rear surface of the liquid crystal panel 210. In this embodiment, the sealing member 270 may cover the side surface of the bonding member 220 as well.

The light leaking through the side surface of the liquid crystal panel 210 may be reflected mainly inside the TFT array substrate 214 and leak through the side surface of the TFT array substrate 214. This is because light having passed through the lower polarizing member 215 may be reflected by the black matrix 213a of the liquid crystal panel 210 and leak through the side surface by being reflected inside the TFT array substrate 214.

Accordingly, in the case where the sealing member 270 overflows toward the rear surface of the liquid crystal panel 210, the effect of blocking light may be enhanced even with a small amount of the sealing member 270.

That is, compared to a case where the front side surface of the liquid crystal panel 210 is sealed and a case where the sealing member overflows toward the front surface of the liquid crystal panel 210, as shown in FIGS. 13(b) and 13(c), sealing the side surface of the liquid crystal panel 210 such that the sealing member 270 overflows toward the rear surface of the liquid crystal panel 210, as shown in FIG. 13(*a*), may be effective in preventing leakage of light.

FIG. 14 is a partial cross-sectional view illustrating a display device according to another embodiment of the present invention, which will be described focusing on the differences from the partial cross-sectional view of the display device of FIG. 13.

In the display device of FIG. 14, the lower polarizing member 215 includes a portion 215*a* overlapping the bonding member 220, and all the light that is incident on the rear surface of the liquid crystal panel 210 from the backlight unit 240 and leaks through the side surface of the liquid crystal panel 210 may be light having passed through the lower polarizing member 215.

Unlike the display device of FIG. 13, the display device of this embodiment may block light leaking from the side surface of the liquid crystal panel 210 (see FIG. 13) using an upper polarizing member 211 instead of the sealing member 270 (see FIG. 13).

The liquid crystal panel 210 may include an upper polarizing member 211 on the front surface of the color filter array substrate 212, which forms an upper substrate. The upper polarizing member 211 may include an extension 211*a* arranged to cover the side surface of the liquid crystal panel 210.

The extension 211*a* of the upper polarizing member 211 may extend from the color filter array substrate 212 to the side surface of the TFT array substrate 214 to cover the side surface of the liquid crystal panel 210. In some cases, the extension 211*a* may contact the side surface of the bonding member 220.

The lower polarizing member 215 and the upper polarizing member 211 of the liquid crystal panel 210 may pass perpendicularly polarized light. Accordingly, light passing through the lower polarizing member 215 may not pass through the upper polarizing member 211 unless the polarization direction is changed.

The liquid crystal panel 210 may include liquid crystals (not shown) between the lower polarizing member 215 and the upper polarizing member 211. The liquid crystals may change the orientation thereof under an electrode applied thereto to allow light passing through the lower polarizing member 215 to pass through the upper polarizing member 211 or block the light from passing through the upper polarizing member 211.

The light leaking through the side surface of the liquid crystal panel 210 may be light that has passed through the lower polarizing member 215, but has not passed through the liquid crystals. In other words, the light may be light that is vertically polarized such that the light cannot pass through the extension 211*a* of the upper polarizing member 211.

Accordingly, the light leaking through the side surface of the liquid crystal panel 210 may be polarized in one direction through the lower polarizing member 215 and may be blocked by the extension 211*a* of the upper polarizing member 211 without the polarization direction thereof changed by the liquid crystals.

A structure for preventing light from leaking through the side surface of the liquid crystal panel 210 or preventing leaking light from being visually recognized on the front surface of the display has been described above.

Hereinafter, a structure for preventing electrostatic discharge (ESD) of charges accumulated on the front surface of the liquid crystal panel 210 from occurring through the side surface of the liquid crystal panel 210 to damage the gate or the line will be described.

Figure 15:
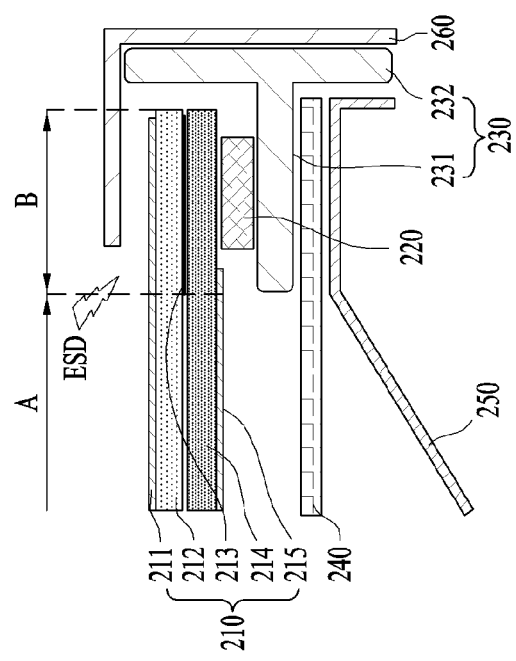
FIG. 15 is a partial cross-sectional view illustrating a structure for preventing electrostatic discharge (ESD) in a liquid crystal module of a case top structure type.
Figure 16:
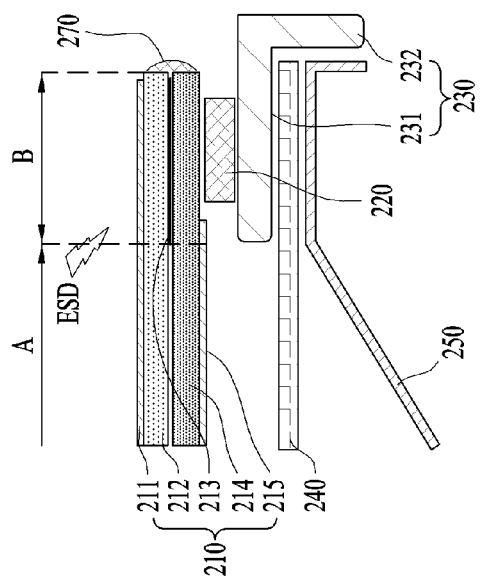
FIG. 16 is a cross-sectional view illustrating a structure for preventing ESD in a cinema-type liquid crystal module.

FIG. 15 is a partial cross-sectional view illustrating a structure for preventing electrostatic discharge (ESD) in a liquid crystal module of a case top structure type, and FIG. 16 is a cross-sectional view illustrating a structure for preventing ESD in a cinema-type liquid crystal module.

FIG. 15 illustrates a display device having the case top structure type LCM described with reference to FIG. 4(*a*), which will be described focusing on the feature of preventing the ESD.

FIG. 16 illustrates a display device having the cinema-type LCM described with reference to FIG. 5(*a*), which will be described focusing on the feature of preventing the ESD.

Static electricity refers to electricity that stays in place without flowing out and may be formed in a place where positive charges or negative charges are concentrated on the surface of a nonconductor. The static electricity may be discharged to achieve equilibrium when a charged object is grounded.

As described with reference to FIG. 13, the liquid crystal panel 210 includes, in the bezel area B, various circuits and elements for controlling the liquid crystal panel 210. Accordingly, when electric charges accumulated on the front surface of the liquid crystal panel 210 flows to the side surface of the liquid crystal panel 210 and is discharged, the liquid crystal panel 210 may be damaged.

In this regard, the display device having the case top structure type LCM as shown in FIG. 14 may prevent damage to the liquid crystal panel 210 according to the ESD using the structure of the case top 260.

Specifically, the display device having the case top structure type LCM is configured such that the charges accumulated on the front surface of the liquid crystal panel 210 may not flow into the side surface of the liquid crystal panel 210, but may be discharged to the rear surface of the display device along the outer surface of the case top 260.

When the case top 260 is connected to a metal member (e.g., the cover bottom 250, the rear cover (not shown)) provided on the rear surface of the display device, damage to the liquid crystal panel 210 according to the ESD may be easily prevented.

That is, in the display device having the case top structure type LCM, the case top 260 may function to prevent light from leaking from the front surface of the display device while preventing the ESD from damaging the liquid crystal panel 210.

The display device having the cinema-type LCM as shown in FIG. 16 may prevent light from leaking through the front surface of the display device and the ESD from damaging the liquid crystal panel 210, using the sealing member 270 for sealing the side surface of the liquid crystal panel 210.

In the display device having the cinema-type LCM, the sealing member 270 for sealing the side surface of the liquid crystal panel 210 may perform the same function as the case top 260 in the case top structure type display device.

Accordingly, if the sealing member 270 for sealing the side surface of the liquid crystal panel 210 is removed from the display device having the cinema-type LCM, light may leak through the front surface of the display device, and the liquid crystal panel 210 may be damaged by the ESD.

Hereinafter, a structure of a display device according to the present invention that has the cinema-type LCM and prevents the ESD from damaging the liquid crystal panel 210 without the sealing member 270 will be described.

Figure 17:
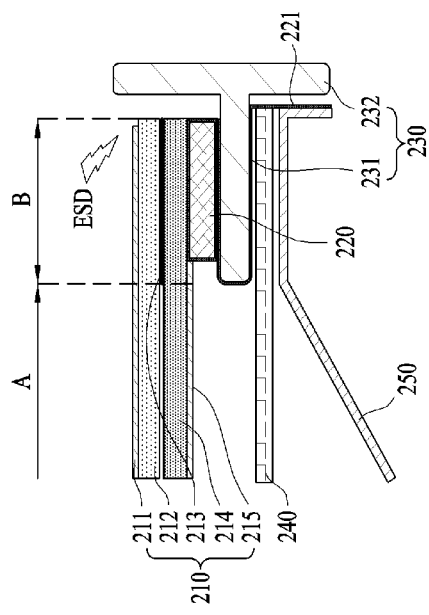
FIG. 17 is a partial cross-sectional view illustrating a display device according to another embodiment of the present invention.

FIG. 17 is a partial cross-sectional view illustrating a display device according to another embodiment of the present invention, which will be described focusing on the differences from the display device of FIG. 6.

The display device of FIG. 17 is a cinema-type display device. In the display device, the lower polarizing member 215 may include a portion overlapping the bonding member 220. Accordingly, the display device may prevent light incident on the rear surface of the liquid crystal panel 210 from the backlight unit 240 from leaking through the side surface of the liquid crystal panel 210 without a sealing member for covering the side surface of the liquid crystal panel 210.

At the same time, the display device of FIG. 17 may prevent charges from flowing into the side surface of the liquid crystal panel 210 and causing the ESD even without other members for covering the side surface of the liquid crystal panel 210.

Specifically, the display device according to the embodiment may include a bonding member 220 which is a conductive foam pad. The bonding member 220 may be connected to a metal member included in the display device via a conductive tape 221.

That is, the electric charges accumulated on the front surface of the liquid crystal panel 210 may be discharged along the bonding member 220 and the conductive tape 221, rather than flowing into the side surface of the liquid crystal panel 210.

The metal member connected to the conductive tape 221 may be a metallic cover bottom 250 or a metallic rear cover (not shown).

The conductive tape 221 may be connected to the inner side surface of the bonding member 220 or partially overlap the rear surface of the bonding member 220.

The conductive tape 221 may be connected to the metal member provided on the rear surface of the display device, along the inner side surface of the panel guide 230.

As is apparent from the above description, the display device according to the present invention has the following effects.

According to embodiments of the present invention, the display device may be provided with a lightweight thin structure through a cinema-type liquid crystal module (LCM).

According to embodiments of the present invention, as a typical liquid crystal panel is used in place of a cinema-dedicated liquid crystal panel (a liquid crystal panel with a sealed edge) in the cinema-type LCM, time required for the product process may be shortened and costs may be reduced.

According to embodiments of the present invention, light may be prevented from leaking through the side surface of the liquid crystal panel in the cinema-type LCM having a typical liquid crystal panel.

According to embodiments of the present invention, electrostatic discharge (ESD) may be prevented from damaging the typical liquid crystal panel provided to the cinema-type LCM.

Further applicability of the present invention will become apparent from the following detailed description. It should be understood, however, that the detailed description and specific examples, such as the preferred embodiment of the invention, are given by way of illustration only, since various changes and modifications within the spirit and scope of the invention will become apparent to those skilled in the art.

It will be apparent to those skilled in the art that the present invention can be embodied in other specific forms without departing from the spirit or essential characteristics thereof.

The foregoing detailed description should not be construed in all aspects as limiting and should be considered illustrative. The scope of the present invention should be determined by rational interpretation of the appended claims, and it is intended that the present invention covers the modifications and variations of this invention provided they come within the scope of the appended claims and their equivalents.

What is claimed is:

1. A display device comprising:
    a liquid crystal panel comprising an active area in which an image is output and a bezel area positioned around the active area;
    a backlight unit configured to emit light to a rear surface of the liquid crystal panel;
    a panel guide comprising a seating portion allowing an edge of the rear surface of the liquid crystal panel to be seated thereon, and a sidewall portion configured to cover a side surface of the liquid crystal panel;
    a bonding member provided in the bezel area and configured to bond the edge of the rear surface of the liquid crystal panel to the seating portion; and
    a lower polarizing member constituting the rear surface of the liquid crystal panel and having an edge overlapping a part of a front surface of the bonding member,
    wherein the liquid crystal panel is formed by bonding an upper substrate and a lower substrate facing each other to each other, the lower polarizing member being arranged on a rear surface of the lower substrate,
    wherein the bonding member is provided in the bezel area, and
    wherein a width by which the bonding member contacts the lower substrate is greater than or equal to two-thirds of a width of the bezel area, and a width by which the bonding member overlaps the lower polarizing member is greater than or equal to half a width by which the lower polarizing member and the bezel area overlaps each other.

2. The display device according to claim 1, wherein the liquid crystal panel comprises:
    an area colored in black to block incident light from the backlight unit and absorb light emitted through the side surface along the liquid crystal panel, the area being provided at the edge of the rear surface of the liquid crystal panel corresponding to the bezel area.

3. The display device according to claim 1, wherein the panel guide comprises:
    a groove provided in a surface of the sidewall portion facing the side surface of the liquid crystal panel; and
    a matt tape provided in the groove to absorb light emitted through the side surface of the liquid crystal panel.

4. The display device according to claim 1, wherein the side surface of the liquid crystal panel is coated with a sealing member to block light emitted through the side surface of the liquid crystal panel.

5. The display device according to claim 4, wherein
    the sealing member overflows toward the rear surface of the liquid crystal panel to seal a side surface of the lower substrate or covers the side surface of the liquid crystal panel and a side surface of the bonding member together.

6. The display device according to claim 1, wherein the liquid crystal panel further comprises:

an upper polarizing member on a front surface of the display device, and wherein the upper polarizing member covers the side surface of the liquid crystal panel.

7. The display device according to claim 1, wherein the liquid crystal panel comprises:

a diffused reflection pattern on at least one of the side surface and the edge of the rear surface.

8. The display device according to claim 7, wherein the diffused reflection pattern is at least one of an embossed or engraved dot pattern, a serration pattern, and a pyramid pattern.

9. The display device according to claim 1, wherein the bonding member is a conductive foam pad, and is connected to a metal member included in the display device via a conductive tape.

10. The display device according to claim 9, wherein the metal member is a rear cover configured to define an outer appearance of a rear surface of the display device.

11. The display device according to claim 1, wherein the bezel area has a width of 3 to 6 mm.

\* \* \* \* \*